United States Patent Office 3,526,660
Patented Sept. 1, 1970

3,526,660
N-(3-AMINOPROPYL)-3-BENZOYL OR SUBSTITUTED BENZOYL-PROPIONAMIDES
William J. Houlihan, Mountain Lakes, N.J., assignor to Sandoz-Wander, Inc., Hanover, N.J., a corporation of Delaware
No Drawing. Original application Mar. 31, 1965, Ser. No. 444,439, now Patent No. 3,334,099. Divided and this application Apr. 13, 1967, Ser. No. 630,525
Int. Cl. C07c 103/22, 103/82
U.S. Cl. 260—558        8 Claims

ABSTRACT OF THE DISCLOSURE

Compounds having the basic structure:

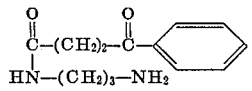

useful as intermediates for sedatives belonging to the class having the basic structural formula:

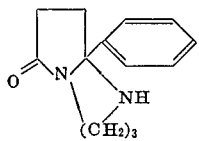

---

This application is a division of S.N. 444,439, filed Mar. 31, 1965 now U.S. Pat. 3,334,099.

The instant invention is directed to three distinct genera of the following formulae:

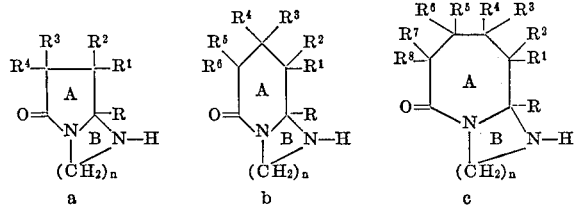

Each genus has three subgenera dependent upon the value of $n$:

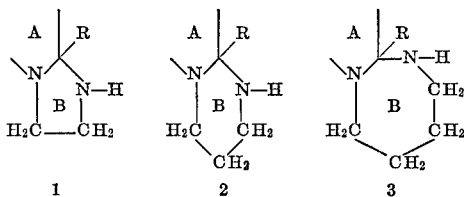

The following definitions are employed throughout the text:

R is either lower straight chain alkyl, e.g. methyl, ethyl, propyl and butyl; aryl, e.g. phenyl; ar(lower) alkyl, e.g. benzyl and phenethyl; or cycloalkyl having from 5 to 7 carbon atoms, e.g. cyclopentyl, cyclohexyl and cycloheptyl; aryl and the ar- of ar(lower)alkyl are of the formula

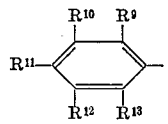

Each of $R^1$, $R^2$, $R^3$, $R^4$, $R^5$, $R^6$, $R^7$, and $R^8$ is either a hydrogen atom (—H) or one of the following functional groups: lower straight chain alkyl, e.g. methyl, ethyl, propyl and butyl; aryl, e.g. parachlorophenyl; ar(lower) alkyl, e.g. 3,5-dimethylbenzyl; cycloalkyl having from 5 to 7 carbon atoms, e.g. cyclopentyl, cyclohexyl and cyclohepytyl; and, together with its counterpart on the same ring carbon atom, polymethylene having from 4 to 6 carbon atoms, e.g. tetramethylene, pentamethylene and hexamethylene; with the proviso that (a) there are no more than three of said functional groups on two adjacent carbon atoms, (b) a plurality of cycloalkyl groups are not bound to adjacent carbon atoms, (c) a plurality of polymethylene groups are not bound to adjacent carbon atoms, and (d) there are a maximum of four of said functional groups on compounds Ib and Ic;

Each of $R^9$, $R^{10}$, $R^{11}$, $R^{12}$, and $R^{13}$ is either a hydrogen atom (—H); a chlorine atom (—Cl); a fluorine atom (—F); a bromine atom (—Br); lower alkyl, preferably having from 1 to 4 carbon atoms, e.g. methyl, ethyl, propyl, isopropyl and butyl; lower alkoxy, preferably having from 1 to 4 carbon atoms, e.g. methoxy, ethoxy, propoxy, isopropoxy and butoxy; trifluoromethyl (—CF$_3$); lower alkylthio, preferably having from 1 to 4 carbon atoms, e.g. methylthio, ethylthio, propylthio, isopropylthio and butylthio; or, together with its counterpart on an adjacent ring carbon atom, methylenedioxy (—O—CH$_2$—O—); with the proviso that (a) at least one of $R^9$, $R^{10}$, $R^{11}$, $R^{12}$ and $R^{13}$ is a hydrogen atom in each aryl and in each ar(lower)alkyl group, (b) a plurality of trifluoromethyl groups are not bound to adjacent carbon atoms, (c) each $R^9$ and $R^{13}$ of aryl and aralkyl groups is a hydrogen atom in a plurality of such groups bound to the same ring carbon atom, (d) each of $R^9$ of aryl and aralkyl groups is a hydrogen atom in a plurality of such groups bound to adjacent ring carbon atoms; and (e) each of $R^9$ and $R^{13}$ of aryl and arlkyl groups bound to the same ring carbon atom as a cycloalkyl group is a hydrogen atom;

$n$ is one of the integers 2, 3 and 4;

A is the azacycloalkanone ring of compounds I; and

B is the ring of compound I which contains two nitrogen atoms.

There are several methods of preparing compounds I. The reaction schemes for two of these methods are presented for the instance when each of $R^1$ to $R^8$ is a hydrogen atom. However, having any of the contemplated functional groups in embodied positions does not alter said methods.

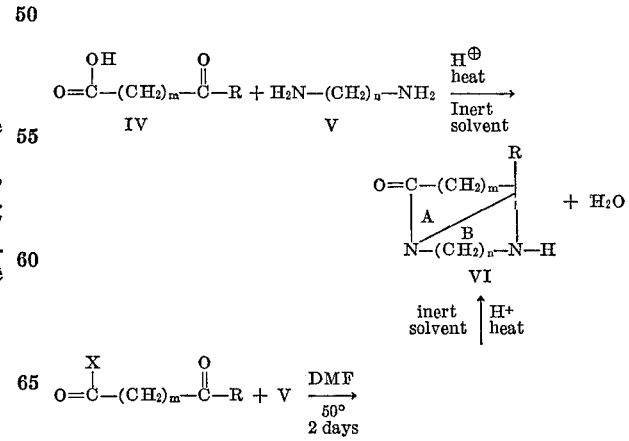

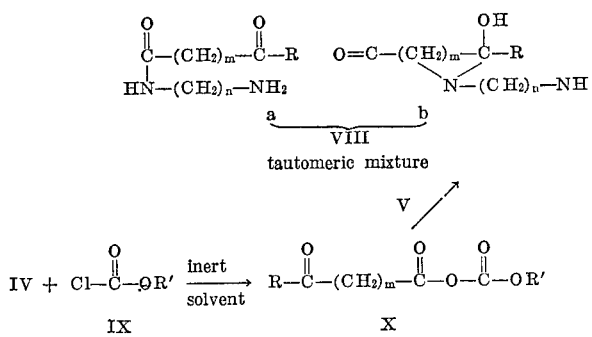

tautomeric mixture $$\text{IV} + \text{Cl}-\overset{\overset{\text{O}}{\|}}{\text{C}}-\text{OR}' \xrightarrow[\text{solvent}]{\text{inert}} \text{R}-\overset{\overset{\text{O}}{\|}}{\text{C}}-(\text{CH}_2)_m-\overset{\overset{\text{O}}{\|}}{\text{C}}-\text{O}-\overset{\overset{\text{O}}{\|}}{\text{C}}-\text{OR}'$$

IX  X wherein

R' is lower alkyl (preferably having from 1 to 5 carbon atoms), e.g. methyl, ethyl, propyl, isopropyl, butyl and amyl;

m is one of the integers 2, 3, and 4; and

X is either a chlorine atom (—Cl) or a bromine atom (—Br).

The tautomeric mixture VIII is separated into its chemical individuals by known procedures, but such separation is not required to prepare compound VI, which is a particular subgroup of compounds I.

The reaction of IV with an alkyl chloroformate (alkyl chlorocarbonate) IX is effected in an inert solvent, e.g. toluene and diethylether, at a temperature from —10° to 100° C., preferably within the range of from —10° to 50° C. Stirring may be employed, but is not required.

For the noted reaction schemes only a catalytic amount of hydrogen ions is needed, as indicated. This is provided by a catalytic quantity of, e.g., para-toluenesulfonic acid. The inert solvent is any solvent, e.g. xylene, which is inert to both the reactants and the reaction products under the employed conditions. The heat that is indicated may vary, but reflux conditions are preferred.

The classes of compounds within the scope of this invention are:

(Ia1) 2,3,5,6,7,7a-hexahydro-1H-pyrrolo[1,2-a]imidazol-5-ones;

(Ia2) 1,2,3,4,6,7,8,8a-octahydro-pyrrolo[1,2-a]-pyrimidin-6-ones;

(Ia3) 2,3,4,5,7,8,9,9a-octahydro-1H-pyrrolo[1,2-a][1,3]diazepin-7-ones;

(Ib1) 1,2,3,5,6,7,8,8a-octahydro-imidazo[1,2-a]pyridin-5-ones;

(Ib2) 1,2,3,4,7,8,9,9a-octahydro-6H-pyrido[1,2-a]pyrimidin-6-ones;

(Ib3) 1,2,3,4,5,7,8,9,10,10a-decahydro-pyrido[1,2-a][1,3]diazepin-7-ones;

(Ic1) 1,2,3,6,7,8,9,9a-octahydro-5H-imidazo[1,2-a]azepin-5-ones;

(Ic2) 1,2,3,4,6,7,8,9,10,10a-decahydro-pyrimido[1,2-a]azepin-6-ones;

(Ic3) 1,2,3,4,5,8,9,10,11,11a-decahydro-7H-azepino[1,2-a][1,3]-diazepin-7-ones.

The starting materials are either known or are prepared by known methods from available compounds.

Compounds I are CNS (central nervous system) active, e.g. depressants and sedatives, compounds and are useful as such. Some also are useful as anti-inflammatories. Compounds I are administered either orally or parenterally in daily doses of from 75 milligrams to 200 milligrams.

Each of the pharmaceutically active compounds of this invention may be, e.g., incorporated for oral administration in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. magnesium stearate; an average dose of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g., alcohol SD–30 and purified water. An exemplary tabletting formation for the instant active compounds is:

| | Parts |
|---|---|
| 9a - phenyl - 1,2,3,4,7,8,9,9a-octahydro-6H-pyrido[1,2-a]pyrimidin-6-one | 50 |
| Tragacanth | 2 |
| Lactose | 39.5 |
| Corn starch | 5 |
| Talcum | 3 |
| Magnesium stearate | 0.5 |
| Alcohol SD–30, purified water, q.s. | |

In the examples which follow, the parts and percentages are by weight unless otherwise specified, and the temperatures are in degrees centigrade. The relationship between parts by weight and parts by volume is the same as that between the kilogram and the liter.

EXAMPLE 1

8a-(4-methoxyphenyl)-1,2,3,4,6,7,8,8a-octahydro-pyrrollo[1,2-a]pyrimidin-6-one

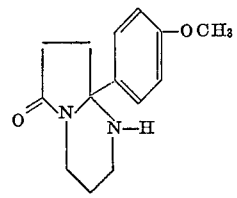

Charge a flask (equipped with a magnetic stirring bar, condenser, thermometer and dropping funnel) with 4.0 parts (0.02 mole) of 3 - (p - methoxybenzoyl) - propionic acid, 2.0 parts (0.02 mole) of triethylamine and 40 parts by volume of chloroform. Stir the obtained solution and cool same to 0°. Add dropwise to the thus-cooled solution a solution [2.2 parts (0.02 mole) of ethyl chloroformate (ethyl chlorocarbonate) in 20 parts by volume of chloroform] at such a rate that the internal temperature of the product does not exceed 10°.

Continue stirring for an additional 2.5 hours before adding dropwise to the resultant solution 3 parts by volume of 1,3-diaminopropane.

Stir the thus-produced solution overnight (17 hours) at room temperature (20°). Decant the chloroform solution from the flask, and wash said solution with water, 1 N hydrochloric acid and saturated (aq.) sodium chloride solution. Dry the washed solution with sodium sulfate. Thereafter remove the solvent in vacuo on a rotary evaporator.

Crystallize the resultant oil from methylene chloride/diethylether to obtain N-(3-aminopropyl)-3-(p-methoxybenzoyl)-propionamide.

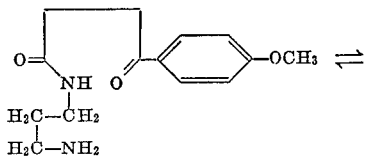

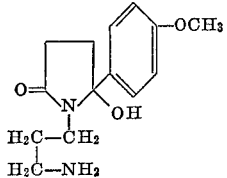

Charge a flask (equipped with a stirrer, heating mantle, condenser and a Dean-Stark tube) with 5.2 parts of N-(3 - aminopropyl) - 3 - (p - methoxybenzoyl) - propionamide, 0.5 part of p-toluenesulfonic acid and 200 parts by volume of toluene. Stir and reflux the contents of the flask until water ceases to separate in the Dean-Stark tube. Remove the solvent on a rotary evaporator.

Dissolve the resultant oil in methanol/water. Admix the obtained solution with charcoal before removing the methanol/water in vacuo. The title compound is thus obtained.

EXAMPLE 2

8a-(3,4-dichlorophenyl)-1,2,3,4,6,7,8,8a-octahydropyrrolo[1,2-a]pyrimidin-6-one

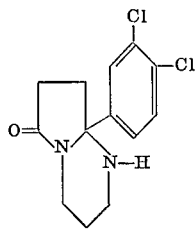

Charge a flask (equipped with a magnetic stirring bar, condenser, thermometer and dropping funnel) with 19.8 parts (0.08 mole) of 3,4-dichlorobenzoyl)propionic acid, 8.0 parts (0.08 mole) of triethylamine and 160 parts by volume of chloroform. Stir the obtained solution and cool same to 0°. Add dropwise to the thus-cooled solution a solution [8.8 parts (0.08 mole) of ethyl chloroformate in 80 parts by volume of chloroform] at such a rate that the internal temperature of the product does not exceed 10°.

Continue stirring for an additional 2.5 hours before adding dropwise to the resultant solution 12 parts by volume (0.08 mole) of 1,3-diaminopropane.

Stir the thus-produced solution overnight at room temperature. Decant the chloroform solution from the flask, and wash said solution with water, 1 N hydrochloric acid and saturated (aq.) sodium chloride solution. Dry the washed solution with sodium sulfate. Thereafter remove the solvent in vacuo on a rotary evaporator.

Crystallize the resultant oil from methylene chloride/ diethylether to obtain N-(3-aminopropyl)-3-(3,4-dichlorobenzoyl)-propionamide.

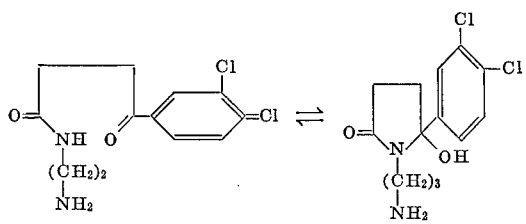

Charge a flask (equipped with a stirrer, heating mantle, condenser and a Dean-Stark tube) with 8.0 parts of N - (3 - aminopropyl) - 3 - (3,4 - dichlorobenzoyl)-propionamide, 0.5 part of para-toluenesulfonic acid and 250 parts by volume of toluene. Stir and reflux the contents of the flask until water ceases to separate in the Dean-Stark tube. Remove the solvent on a rotary evaporator.

Dissolve the resultant oil in methylene chloride/pentane. Admix the obtained solution with charcoal before removing the methylene chloride/pentane in vacuo. The title compound is thus obtained.

EXAMPLE 3

8a-(4-fluorophenyl)-1,2,3,4,6,7,8,8a-octahydro-pyrrolo[1,2-a]pyrimidin-6-one

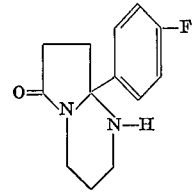

Charge a flask (equipped with a magnetic stirring bar, condenser, thermometer and dropping funnel) with 19.6 parts (0.10 mole) of 3-(4-fluorobenzoyl)propionic acid, 10 parts (0.10 mole) of triethylamine and 200 parts by volume of chloroform. Stir the obtained solution and cool same to 0°. Add dropwise to the thus-cooled solution a solution [11.0 parts (0.10 mole) of ethyl chloroformate in 100 parts by volume of chloroform] at such a rate that the internal temperature of the product does not exceed 10°.

Continue stirring for an additional 2.5 hours before adding dropwise to the resultant solution 15 parts by volume of (0.10 mole) 1,3-diaminopropane.

Stir the thus-produced solution overnight at room temperature. Decant the chloroform solution from the flask, and wash said solution with water, 1 N hydrochloric acid and saturated (aq.) sodium chloride solution. Dry the washed solution with sodium sulfate. Thereafter remove the solvent in vacuo on a rotary evaporator.

Crystallize the resultant oil from methylene chloride/ diethylether to obtain N-(3-aminopropyl)-3-(4-fluorobenzoyl)-propionamide.

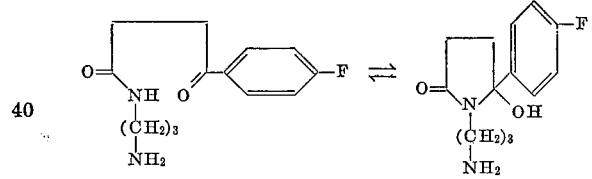

Charge a flask (equipped with a stirrer, heating mantle, condenser and a Dean-Stark tube) with 8.2 parts of N-(3 - aminopropyl)-3-(4-fluorobenzoyl)-propionamide, 0.5 part of para-toluenesulfonic acid and 200 parts by volume of toluene. Stir and reflux the contents of the flask until water ceases to separate in the Dean-Stark tube. Remove the solvent on a rotary evaporator.

Dissolve the resultant oil in methanol/water. Admix the obtained solution with charcoal before removing the methanol/water in vacuo. The title compound is thus obtained.

EXAMPLE 4

8a-(4-methylphenyl)-1,2,3,4,6,7,8,8a-octahydro-pyrrolo [1,2-a]pyrimidin-6-one

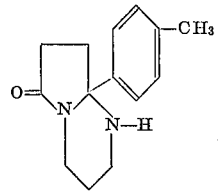

Charge a flask (equipped with a magnetic stirring bar, condenser, thermometer and dropping funnel) with 15.4 parts (0.08 mole) of 3-(4-methylbenzoyl)-propionic acid, 8.0 parts (0.08 mole) of triethylamine and 160 parts by volume of chloroform. Stir the obtained solution and cool same to 0°. Add dropwise to the thus-cooled solution a solution [8.8 parts (0.08 mole) of ethyl chloroformate in 80 parts by volume of chloroform] at such a rate that the internal temperature of the product does not exceed 10°.

Continue stirring for an additional 2.5 hours before adding dropwise to the resultant solution 12 parts by volume (0.08 mole) of 1,3-diaminopropane.

Stir the thus-produced solution overnight at room temperature. Decant the chloroform solution from the flask, and wash said solution with water, 1 N hydrochloric acid and saturated (aq.) sodium chloride solution. Dry the washed solution with sodium sulfate. Thereafter remove the solvent in vacuo on a rotary evaporator.

Crystallize the resultant oil from methylene chloride/diethylether to obtain N-(3-aminopropyl)-3-(4-methylbenzoyl)-propionamide.

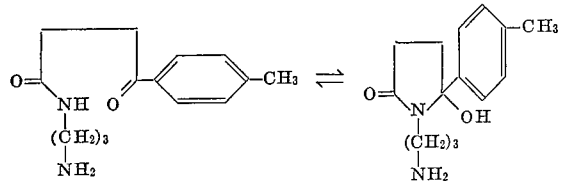

Charge a flask (equipped with a stirrer, heating mantle, condenser and a Dean-Stark tube) with 8.0 parts of N-(3-aminopropyl) - 3 - (4 - methylbenzoyl)-propionamide, 0.5 part of paratoluenesulfonic acid and 200 parts by volume of toluene. Stir and reflux the contents of the flask until water ceases to separate in the Dean-Stark tube. Remove the solvent on a rotary evaporator.

Dissolve the resultant oil in methanol/water. Admix the obtained solution with charcoal before removing the methanol/water in vacuo. The title compound is thus obtained.

EXAMPLE 5

8a-(2,4-dimethylphenyl)-1,2,3,4,6,7,8,8a-octahydropyrrolo[1,2-a]pyrimidin-6-one

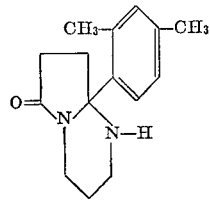

Charge a flask (equipped with a magnetic stirring bar, condenser, thermometer and dropping funnel) with 4.1 parts (0.02 mole) of 3-(2,4-dimethylbenzoyl)-propionic acid, 2.0 parts (0.02 mole) of triethylamine and 40 parts by volume of chloroform. Stir the obtained solution and cool same to 0°. Add dropwise to the thus-cooled solution [2.2 parts (0.02 mole) of ethyl chloroformate in 20 parts by volume of chloroform] at such a rate that the internal temperature of the product does not exceed 10°.

Continue stirring for an additional 2.5 hours before adding dropwise to the resultant solution 3.0 parts by volume (0.02 mole) of 1,3-diaminopropane.

Stir the thus-produced solution overnight at room temperature. Decant the chloroform solution from the flask, and wash said solution with water, 1 N hydrochloric acid and saturated (aq.) sodium chloride solution. Dry the washed solution with sodium sulfate. Thereafter remove the solvent in vacuo on a rotary evaporator.

Crystallize the resultant oil from methylene chloride/diethyl ether to obtain N-(3-aminopropyl) - 3 - (2,4-dimethylbenzoyl)-propionamide.

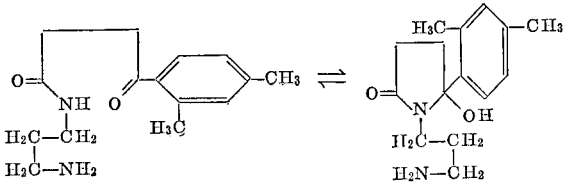

Charge a flask (equipped with a stirrer, heating mantle, condenser and a Dean-Stark tube) with 20.6 parts (0.10 mole) of 3-(2,4-dimethylbenzoyl)-propionic acid, 14.8 parts (0.20 mole) of 1,3-diaminopropane, 1.0 part of p-toluenesulfonic acid and 250 parts by volume of xylene. Stir and reflux the contents of the flask until water ceases to separate in the Dean-Stark tube. Remove the solvent on a rotary evaporator.

Dissolve the resultant oil in methanol/water. Admix the obtained solution with charcoal before removing the methanol/water in vacuo. The title compound is thus obtained.

EXAMPLE 6

8a-(2,5-dimethylphenyl)-1,2,3,4,6,7,8,8a-octahydropyrrolo[1,2-a]pyrimidin-6-one

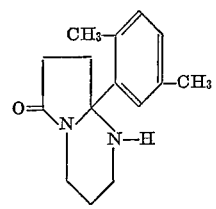

Charge a flask (equipped with a magnetic stirring bar, condenser, thermometer and dropping funnel) with 4.1 parts (0.02 mole) of 3-(2,5-dimethylbenzoyl)-propionic acid, 2.0 parts (0.02 mole) of triethylamine and 40 parts by volume of chloroform. Stir the obtained solution and cool same to 0°. Add dropwise to the thus-cooled solution a solution [2.2 parts (0.02 mole) of ethyl chloroformate in 20 parts by volume of chloroform] at such a rate that the internal temperature of the product does not exceed 10°.

Continue stirring for an additional 2.5 hours before adding dropwise to the resultant solution 3 parts by volume of 1,3-diaminopropane.

Stir the thus-produced solution overnight at room temperature. Decant the chloroform solution from the flask, and wash said solution with water, 1 N hydrochloric acid and saturated (aq.) sodium chloride solution. Dry the washed solution with sodium sulfate. Thereafter remove the solvent in vacuo on a rotary evaporator.

Crystallize the resultant oil from methylene chloride/diethylether to obtain N-(3-aminopropyl)-3-(2,5-dimethylbenzoyl)-propionamide.

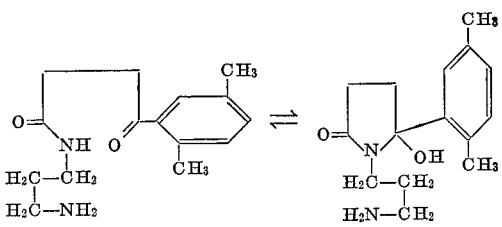

Charge a flask (equipped with a stirrer, heating mantle, condenser and a Dean-Stark tube) with 25.7 parts of N-(3-aminopropyl) - 3 - (2,5 - dimethylbenzoyl)-propionamide, 1.0 part of p-toluenesulfonic acid and 500 parts by volume of toluene. Stir and reflux the contents of the flask until water ceases to separate in the Dean-Stark tube. Remove the solvent on a rotary evaporator.

Dissolve the result oil in methanol/water. Admix the obtained solution with charcoal before removing the methanol/water in vacuo. The title compound is thus obtained.

EXAMPLE 7

8a(4-chlorophenyl)-1,2,3,4,6,7,8,8a-octahydro-pyrrolo[1,2-a]pyrimidin-6-one

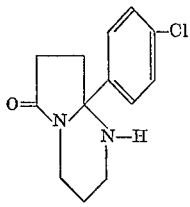

Charge a flask (equipped with a magnetic stirring bar, condenser, thermometer and dropping funnel) with 21.3 parts (0.10 mole) of 3-(p-chlorobenzoyl)-propionic acid, 10 parts (0.10 mole) of triethylamine and 200 parts by volume of chloroform. Stirr the obtained solution and cool same to 0°. Add dropwise to the thus-cooled solution a solution [11.0 parts (0.10 mole) of ethyl chloroformate in 100 parts by volume of chloroform] at such a rate that the internal temperature of the product does not exceed 10°.

Continue stirring for an additional 2.5 hours before adding dropwise to the resultant solution 15 parts by volume of 1,3-diaminopropane.

Stir the thus-produced solution overnight at room temperature. Decant the chloroform solution from the flask, and wash said solution with water, 1 N hydrochloric acid and saturated (aq.) sodium chloride solution. Dry the washed solution with sodium sulfate. Thereafter, remove the solvent in vacuo on a rotary evaporator.

Crystallize the resultant oil from methylene chloride/diethylether to obtain N-(3-aminopropyl)-3-)p-chlorobenzoyl)propionamide.

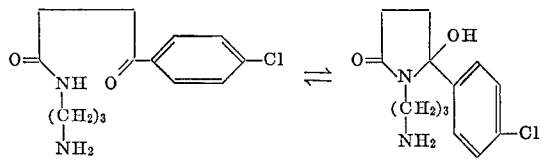

Charge a flask (equipped with a stirrer, heating mantle, condenser and a Dean-Stark tube) with 8.8 parts of N-(3-aminopropyl)-3-(p-chlorobenzoyl)-propionamide, 0.5 part of p-toluenesulfonic acid and 200 parts by volume of toluene. Stir and reflux the contents of the flask until water ceases to separate in the Dean-Stark tube. Remove the solvent on a rotary evaporator.

Dissolve the resultant oil in methylene chloride/pentane. Admix the obtained solution with charcoal before removing the methylene chloride/pentane in vacuo. The title compound is thus obtained.

What is claimed is:

1. A compound of the formula:

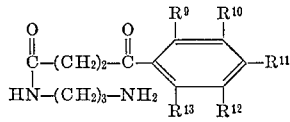

wherein each of $R^9$, $R^{10}$, $R^{11}$, $R^{12}$ and $R^{13}$ represents hydrogen, chloro, fluoro, lower alkyl or lower alkoxy.

2. The compound of claim 1 which is N-(3-aminopropyl)-3-(p-methoxybenzoyl)propionamide.
3. The compound of claim 1 which is N-(3-aminopropyl)-3-(3,4-dichlorobenzoyl)propionamide.
4. The compound of claim 1 which is N-(3-aminopropyl)-3-(p-fluorobenzoyl)propionamide.
5. The compound of claim 1 which is N-(3-aminopropyl)-3-(p-methylbenzoyl)propionamide.
6. The compound of claim 1 which is N-(3-aminopropyl)-3-(2,4-dimethylbenzoyl)propionamide.
7. The compound of claim 1 which is N-(3-aminopropyl)-3-(2,5-dimethylbenzoyl)propionamide.
8. The compound of claim 1 which is N-(3-aminopropyl)-3-(p-chlorobenzoyl)propionamide.

References Cited

UNITED STATES PATENTS 2,009,144  7/1935  Micscher et al. _____ 260—558

ALEX MAZEL, Primary Examiner

B. I. DENTZ, Assistant Examiner

U.S. Cl. X.R.

260—326.5, 309.7, 239, 294.7